United States Patent [19]
Mizumoto

[11] Patent Number: 5,305,373
[45] Date of Patent: Apr. 19, 1994

[54] CORDLESS TELEPHONE APPARATUS INCLUDING AN ANTENNA GAIN SWITCHING CIRCUIT

[76] Inventor: Tooru Mizumoto, c/o Intellectual Property Division, Kabushiki Kaisha Toshiba, 1-1 Shibaura 1-chome, Minato-ku, Tokyo 105, Japan

[21] Appl. No.: 653,517

[22] Filed: Feb. 11, 1991

[30] Foreign Application Priority Data

Feb. 13, 1990 [JP] Japan .................................. 2-29481

[51] Int. Cl.⁵ .......................................... H04M 11/00
[52] U.S. Cl. ........................................ 379/61; 379/58; 455/123
[58] Field of Search .................... 379/58, 61, 60; 455/246.1, 247.1, 248.1, 249.1, 251.1.289, 291, 293, 283, 284, 193.1, 193.2, 123, 69, 70, 253.2

[56] References Cited

U.S. PATENT DOCUMENTS 4,939,766 7/1990 Umemoto et al. .................... 379/61
5,012,235 4/1991 Andros et al. ...................... 455/54.1

FOREIGN PATENT DOCUMENTS 0004122 1/1989 Japan ................................ 455/249.1

Primary Examiner—Curtis Kuntz
Assistant Examiner—George J. Oehling

[57] ABSTRACT

A cordless telephone apparatus comprising a base station telephone set, which is connected to a wire telephone network, and a plurality of portable radio telephone sets coupled by said base station telephone set and a radio network, and the portable radio telephone sets having a comparator for comparing a receive signal with a reference signal and a gain switching circuit for switching an antenna gain in accordance with the compared result of the comparator.

6 Claims, 3 Drawing Sheets

CORDLESS TELEPHONE APPARATUS INCLUDING AN ANTENNA GAIN SWITCHING CIRCUIT

BACKGROUND OF THE INVENTION

1. Field of the Invention

The present invention relates to a cordless telephone apparatus having an antenna gain control circuit.

2. Description of the Related Art

Generally, a cordless telephone comprises a base station, which is connected to a wire telephone network, and a plurality of movable portable sets. The base station and the portable sets are connected to each other by a wireless or radio network. In the conventional cordless telephone apparatus, in a case where the portable set initiates a call, a predetermined key pad button is pressed in the portable set. A signal for setting a talking channel is then input into a control circuit of the movable portable set. A resultant talking channel setup is transmitted through an antenna via the wireless network to the base station.

The base station receives the transmitted radio signals from the portable set, and modulates the received signal. The modulated signal closes a line switch provided in a hybrid circuit via a baseband circuit of the base station. The wire telephone network and the base station are connected to each other by the line switch, and talking can be performed between the base station and the wire telephone over a line wire. The control circuit of the base station transmits a signal to the portable set by wireless, to indicate that the base station and the wire network are connected to each other.

In a case where telephone communications using two portable sets A and B are simultaneously performed, if the portable set A is positioned close to the base station and the portable set B is positioned further away from the base station, the base station receives a high field intensity radio signal from the portable set A and a low field intensity radio signal from portable set B. When the receiver of the base station receives the radio signal from the portable set B, its receiving sensitivity for the radio signal from portable set B is relatively the communication quality with the portable set B is accordingly worsened. The signal/noise may be deteriorated to the point that the base station cannot receive radio signals transmitted the portable set B and a connection between the portable set B and the base station will not be made.

SUMMARY OF THE INVENTION

An object of the present invention is to provide a cordless telephone apparatus wherein the communication quality is not deteriorated even if the telephone communications using a plurality of portable radio telephone sets are simultaneously performed via a base station telephone set regardless of the distance between the base station telephone set and the portable radio telephone sets.

According to the present invention, there is provided a cordless telephone apparatus comprising a base station telephone set to be connected to a wire telephone network, a plurality of portable radio telephone sets to be coupled with the base station telephone set via a wireless network, a comparator for comparing a receive signal received by the base station telephone set with a reference signal, and a gain switching circuit for switching an antenna gain in accordance with the compared result.

According to the present invention, in the portable radio telephone sets, intensity of electric field of the receive signal is determined and the antenna gain is changed in accordance with the receive signal level. Therefore, even if the telephone communications using a plurality of portable radio telephone sets are simultaneously performed via a base station telephone set, the portable radio telephone set close to the base station telephone set applies no high intensity field to the other portable radio telephone set. As a result, the telephone communications using the plurality of portable radio telephone sets can be simultaneously performed regardless of the distance between the base station telephone set and the portable radio telephone sets.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
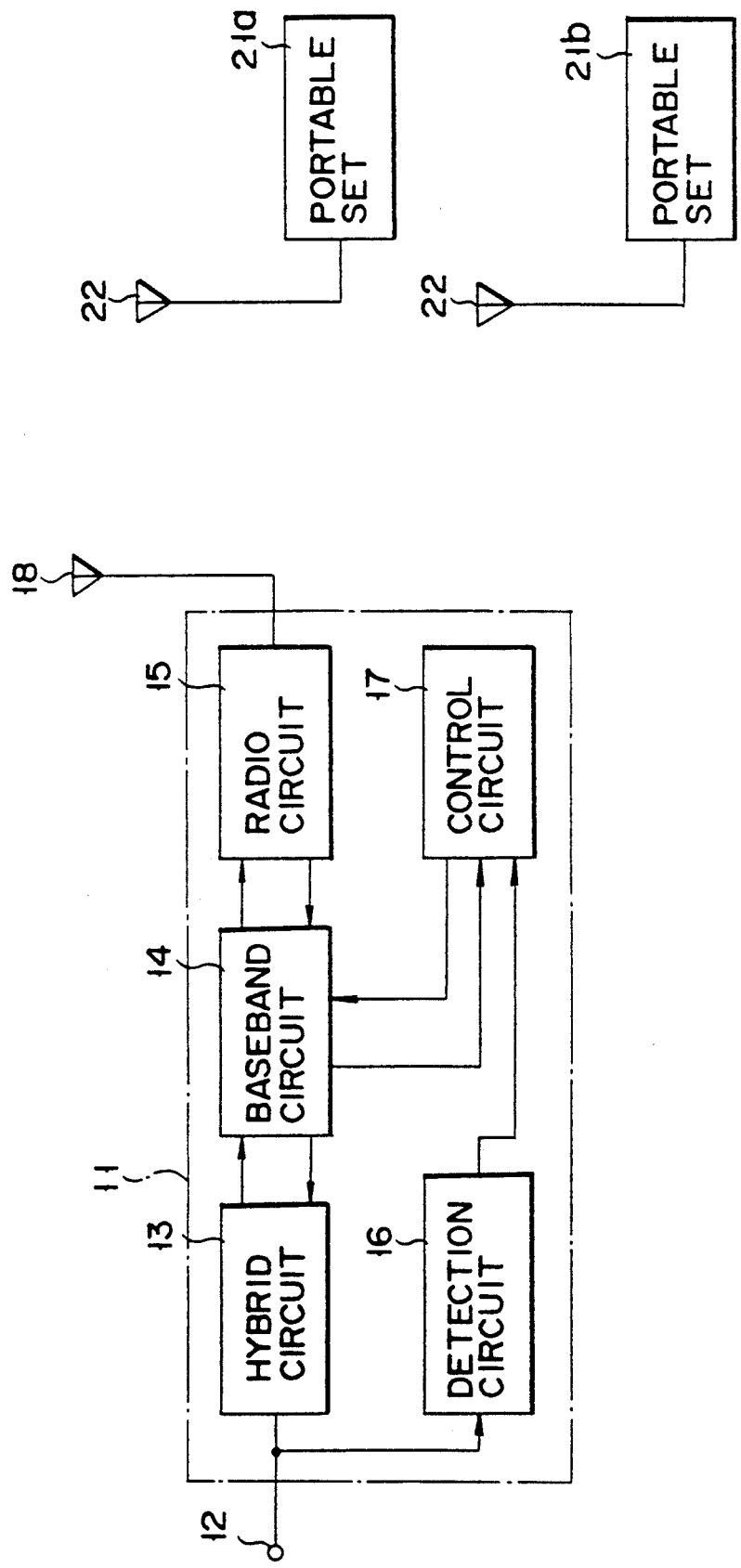
FIGS. 1 and 2 are block circuit diagrams of a cordless telephone apparatus in accordance with one embodiment of the present invention.

In FIG. 1, a base station telephone set 11 has a terminal 12 for connection to a wire network. A radio circuit 15 is connected to the terminal 12 via a hybrid circuit 13 and a base band circuit 14 and a call-signal detection circuit 16.

The hybrid circuit 13 has a line switch for forming a d.c. loop, and the base band circuit 14 has a function of allowing a talking signal to correspond to a transmission signal. The output terminals of the base band circuit 14 and detection circuit 16 are connected to a control circuit 17.

The control circuit 17 transmits a which represents that the base station telephone set 11 has been connected to the wire network, to the radio circuit 15. The radio circuit 15 transmits a network connection signal to a plurality of portable radio telephone sets 21a and 21b via an antenna 18.

Figure 2:
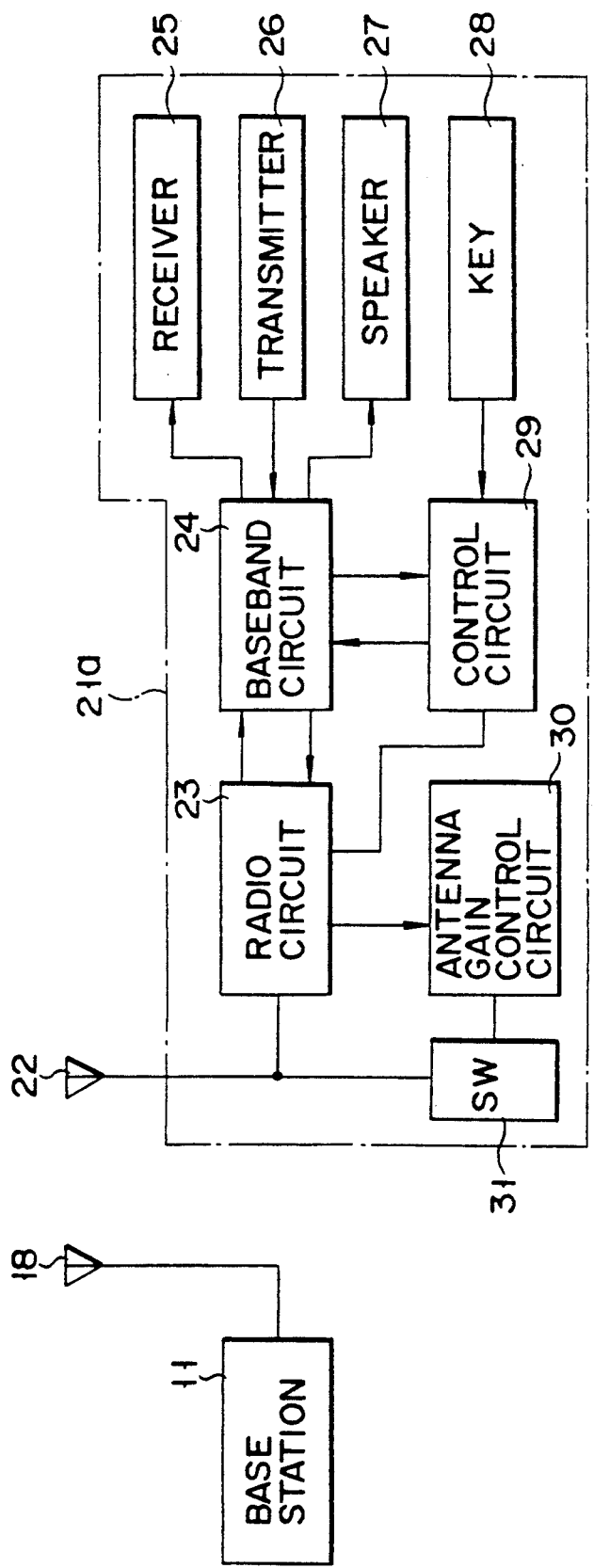

As shown in FIG. 2, respective portable radio telephone sets 21a and 21b receive a signal transmitted from the base station, and have an antenna 22 emitting a signal to the base station telephone set 11. The antenna 22 is connected to a receiver 25, a transmitter 26, and a speaker 27 via a radio circuit 23, and a base band 24.

The radio circuit 23 is provided to demodulate the receive signal and modulate the transmission signal. The baseband circuit 24 is provided to allow the talking signal to correspond to the transmission signal. The receiver 25 and the transmitter 26 are devices for performing the talking, and the speaker 27 is provided so as to output a call signal as a calling tone.

A key pad 28 is connected to a control circuit 29 to send a dial signal to the control circuit 29. The control circuit 29 controls the radio channel of the radio circuit 23 or the radio connection with the base station telephone set 11.

Figure 3:
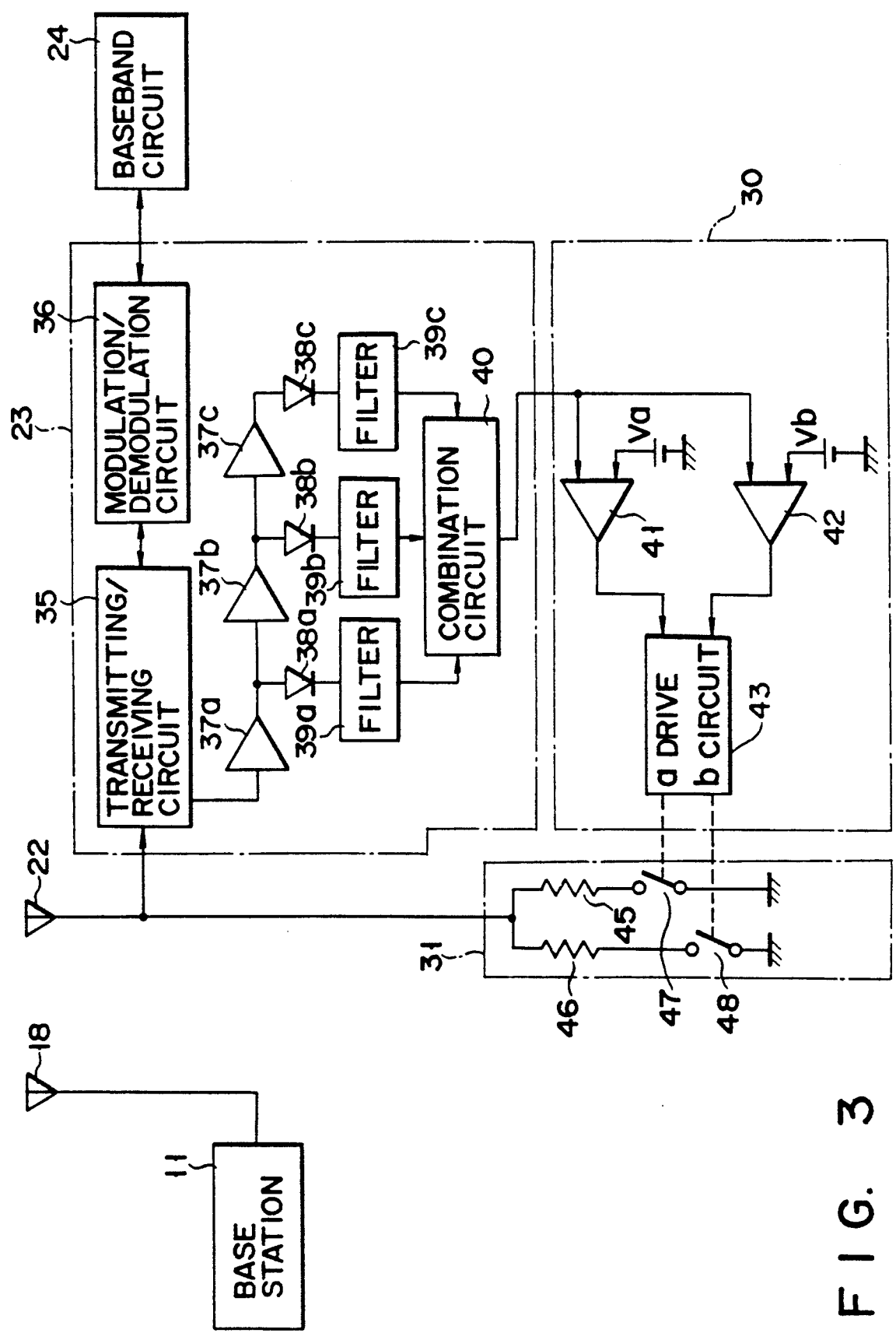
FIG. 3 is a circuit diagram showing the specific structure of a radio circuit of the portable radio telephone set of the telephone apparatus of FIG. 2, an antenna gain controlling circuit, and a switching circuit.

The output terminal of the radio circuit 23 is connected to the input terminal of an antenna gain control circuit 30 which is connected to an antenna gain switching circuit 31. The antenna gain control system will be explained in detail with reference to FIG. 3.

In the radio circuit 23, there are provided a transmitting/receiving circuit 35 whose one end is connected to the antenna 22, and a modulation/demodulation circuit 36 having one end connected to the other end of the transmitting/receiving circuit 35 and having the other end connected to the base band circuit 24. The radio circuit 23 has a transmitting/receiving circuit 35 and a modulation/demodulation circuit 36 for processing the signal received from the base station 11.

The radio circuit 23 demodulates the received signal, and sends the demodulated signal to the base band circuit 24. A signal to be transmitted from the base band circuit 24 is demodulated and transmitted.

The signal transmitted from the base station telephone set 11 is sent to the receiving circuit of the transmitting/receiving circuit 35, and three cascaded amplifiers stages 37a, 37b, and 37c, are connected thereto. The output terminals of the amplifiers 37a, 37b, and 37c are respectively connected to filters 39a, 39b, and 39c via diodes 38a, 38b, and 38c in a forward direction. The output terminals of the filters 39a, 39b, and 39c are connected to the input terminal of a signal combination circuit 40.

According to the above-mentioned circuit structure, the receive signal is amplified by the three amplifier 37a to 37c. The amplified signal sent from the amplifiers is input into the signal combination circuit 40 via the diodes 38a to 38c and the filters 39a to 39c, and synthesized. As a result, the voltage signal according to the level of the receive signal can be detected in such a manner that the width of dynamic range is widened.

The output terminal of the signal combination circuit 40 of the receiving circuit 23 is connected to the input terminal of the antenna gain control circuit 30. In the antenna gain control circuit 30, two comparators 41 and 42 are provided.

The comparators 41 and 42 have a first input terminal receiving the output of the signal combination circuit 40 and a second input terminal receiving reference voltages Va and Vb. The comparators 41 and 42 compare the combined signal with reference voltages Va and Vb. Then, if the combined signal is higher than reference voltages Va and Vb, a level signal of "1" is output, and if the combined signal is lower than reference voltages Va and Vb, a level signal of "0" is output. In this case, these reference voltages are set to Va<Vb.

The output terminals of the comparators 41 and 42 are connected to the input terminal of a drive circuit 43. The drive circuit 43 outputs a switching signal to the antenna gain switching circuit 31 in accordance with the output signals of the comparators 41 and 42. The antenna gain switching circuit 31 has resistance members 45 and 46 and relay switches 47 and 48 connected to the resistors 45 and 46 in series. The resistance values of the resistors 45 and 46 are set so that the resistance value of the resistor 45 is less than that of the resistor 46.

In the antenna gain switching circuit 31, if the relay switches 47 and 48 are closed by the switching signal output from the drive circuit 43, the antenna 22 is grounded via the resistor 45 or 46. In other words, the antenna gain is switched.

The operation of the cordless telephone structure described hereinabove will be explained.

For example, if a radio signal to be transmitted from the base station telephone set 11 is sent to the portable radio telephone set 21a, the transmitting/receiving circuit 35 of the radio circuit 23 of the portable radio telephone set 21a receives a transmitting signal, and the signal is input into the amplifier 37a. The receive signal is amplified by the amplifiers 37a, 37b, and 37c. The output signals from these amplifiers are input into the signal combination circuit 40 via the diodes 38a to 38c and the filters 39a to 39c, and combined.

The signal combination circuit 40 outputs a voltage signal, as a representation of the receive signal, to the comparators 41 and 42 of the antenna gain control circuit 30. The comparators 41 and 42 compare the input voltage signal with reference voltages Va and Vb. If the input voltage (Vin) signal is lower than the reference voltages Va and Vb, the comparators 41 and 42 apply level signals of "0" to the drive circuit 43.

The drive circuit 43 receives the two "0" level signals, and determines that the distance between the base station telephone set 11 and the portable radio telephone set 21a is large, so that no switch signal is generated. Therefore, the relay switches 47 and 48 of the antenna gain switch circuit 31 are closed. In this state, the maximum value of the antenna gain is applied and the antenna 22 receives/transmits the transmitting signal with high sensitivity.

If the input voltage (Vin) signal is higher than the reference voltage Va and lower than reference voltage Vb, the comparator 45 outputs a level signal of "1" and the comparator 46 outputs a level signal of "0." In other words, "1" and "0" level signals are applied to the drive circuit 43. In this case, the drive circuit 43 determines that the portable radio telephone set 21a is positioned relatively close to the base station telephone set 11, and outputs the switch signal from an output terminal a. Since the relay switch 47 is closed by the switch signal, the antenna 22 is grounded via the resistor 45. In other words, the gain of the antenna 22 is reduced in accordance with the resistance value of the resistor 45. Therefore, the antenna 22 receives/transmits the signal with intermediate sensitivity.

If the input voltage (Vin) signal is higher than reference voltages Va, Vb, the comparators 45 and 46 output level signals of "1." In other words, two "1" level signals are input into the drive circuit 43. In this case, the drive circuit 43 determines that the portable telephone set 21a is positioned very close to the base station telephone set 11, and outputs the switch signal from an output terminal b. Since the relay switch 48 is closed by the switch signal, from the terminal b, the antenna 22 is grounded via the resistor 46. Since the resistor 45 has a resistance value less than that of the resistor 46, the gain of the antenna 22 is further reduced in accordance with the resistance value of the resistor 46. Therefore, the antenna 22 receives/transmits the signal with low sensitivity.

Thus, in the preferred invention embodiment, circuitry is employed in which the antenna gain is controlled in accordance with the distance between the base station telephone set 11 and the portable radio telephone sets 21a and 21b. Even if telephone communications using portable radio telephone sets 21a and 21b are simultaneously performed, the electric field of the portable radio telephone set, which is close to the base station telephone set 11, does not affect the telephone communication using the other portable radio telephone set. For this reason, quality telephone communications can be simultaneously performed between the base station telephone set 11 and a plurality of portable radio telephone sets.

Additionally, when the telephone communications are finished, the relay switches 47 and 48 are closed since the input voltage signal reaches low level. If the telephone communications are restarted, the antenna gain is changed in accordance with the distance between the base station telephone set 11 and the portable radio telephone sets 21a and 21b. The plurality of the portable telephone sets can then receive/transmit the signal from/to the base station telephone set 11 with substantially equal intensity of electric field.

In the described preferred embodiment, the antenna gain is controlled in accordance with the distance between the base station telephone set 11 and the portable radio telephone sets 21a and 21b. However, even if the receiving/transmitting output of the radio circuit 23 is controlled in accordance with the distance between the base and portable sets, the same effect as that described for the preferred embodiment can be obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A cordless telephone apparatus comprising:
a base station telephone set, which is connected to a wire telephone network; and
a plurality of portable radio telephone sets coupled by said base station telephone set and a radio network, each of the plurality of portable radio telephone sets including:
radio means for receiving a first radio signal transmitted from said base station telephone set and generating a second radio signal to be transmitted, said radio means having an antenna for receiving a transmission signal from said base station telephone set and emitting a signal to be transmitted;
gain control means for controlling a gain of said radio means in accordance with a level of a receive signal received by said radio means, said gain control means including antenna gain control means for controlling the gain of said antenna in accordance with the level of said receive signal, said antenna gain control means having a plurality of load resistors selectively connected to said antenna; and
switch means for selectively connecting said load resistors to said antenna so as to control said antenna gain in accordance with the level of said receive signal.

2. A cordless telephone apparatus comprising:
a base station telephone set, which is connected to a wire telephone network; and
a plurality of portable radio telephone sets coupled by said base station telephone set and a radio network, each of said plurality of portable radio telephone sets including:
radio means for receiving a first radio signal transmitted from said base station telephone set and generating a second radio signal to be transmitted;
gain control means for controlling a gain of said radio means in accordance with a level of a receive signal received by said radio means;
said gain control means having reference signal generating means for generating at least a first reference signal level and a second reference signal level higher than the first reference signal level;
a comparator for comparing said receive signal level with said first and second reference signal levels and outputting a first control signal when said receive signal level is lower than said first and second signal levels, a second control signal when said receive signal level is higher than said first reference signal level and lower than said second reference signal level, and a third control signal when said receive signal level is higher than said first and second reference signal levels;
antenna gain switching means for switching an antenna gain to a maximum value in response to said first control signal, a first gain value, which is lower than the maximum value of said antenna gain, in response to said second control signal, and a second gain value, which is lower than said first gain value, in response to said third control signal;
said antenna gain control means having first and second load resistors having resistance values respectively corresponding to said first and second gain values; and
switch means for selectively connecting the load resistors to said antenna in response to said second and third control signals.

3. A cordless telephone apparatus comprising:
a base station telephone set, which is connected to a wire telephone network; and
a plurality of portable radio telephone sets coupled to said base station telephone est and a radio network, each of said plurality of portable radio telephone sets including:
radio means for receiving a first radio signal transmitted from said base station telephone est and generating a second radio signal to be transmitted;
gain control means for controlling a gain of said radio means in accordance with a level of a receive signal received by said radio means;
said radio means having an antenna for receiving a transmission signal from said base station telephone set and emitting a signal to be transmitted, and said gain control means including antenna gain control means controlling the gain of said antenna in accordance with the level of said receive signal;
said gain control means having reference signal generating means for generating a plurality of different reference signal levels;
a comparator for comparing said receive signal level with said reference signal level and outputting a control signal in accordance with the compared results between said receive signal level and said plurality of reference signal levels;
antenna gain control means for controlling the antenna gain in response to said control signal;

said antenna gain control means having first and second load resistors having resistance values respectively corresponding to the plurality of the antenna gain values; and switch means for selectively connecting the load resistors to said antenna in response to said control signal.

4. A cordless telephone apparatus comprising:

a base station telephone set, which is connected to a wire telephone network; and a plurality of portable radio telephone sets coupled by said base station telephone set and a radio network, each of said plurality of portable radio telephone sets including:

radio means for receiving the first radio signal transmitted from said base station telephone set and generating a second radio signal to be transmitted;

gain control means for controlling a gain of the portable radio telephone set's antenna in accordance with a level of a receive signal received by said radio means;

said radio means having amplifying means including a plurality of cascaded amplifiers of each having an input terminal for a signal transmitted from said base station telephone set and an output terminal;

a plurality of diodes respectively connected to the output terminals of said amplifiers;

a plurality of filters each having an input terminal connected to said amplifier through the diodes in the forward direction and an output terminal for outputting an output signal; and a combination circuit for combining the outputs of said filters and outputting a voltage signal corresponding to said receive signal to said gain control means.

5. A cordless telephone apparatus comprising:

a base station telephone set, which is connected to a wire telephone network; and a plurality of portable radio telephone sets coupled by said base station telephone set and a radio network, each of said plurality of portable radio telephone sets including:

an antenna;

radio means, coupled to said antenna, for receiving a radio signal to be transmitted from said base station telephone set, and generating a radio signal to be transmitted;

antenna gain control means for controlling a gain of said antenna in accordance with a level of the radio signal received from said radio means;

said antenna gain control means having a plurality of load resistors selectively connected to said antenna; and switch means for selectively connecting said load resistors to said antenna in accordance with the level of said received radio signal.

6. A cordless telephone apparatus comprising:

a base station telephone set connected to a wire telephone network, for receiving a talking signal and transmitting a first radio signal corresponding to the talking signal; and a plurality of portable radio telephone sets including:

radio means for receiving the first radio signal transmitted from said base station telephone set, and generating a second radio signal to be transmitted to said base station telephone set, said radio means including an antenna for emitting the second radio signal;

means for detecting a level of a receive signal corresponding to the first radio signal; and gain control means connected to said antenna, for controlling a gain of said antenna in accordance with the level of the receive signal received by said radio means;

said antenna gain control means having a plurality of load resistors selectively connected to said antenna; and switch means for selectively connecting said load resistors to said antenna to control the antenna gain in accordance with the level of the receive signal.

* * * * *